(12) United States Patent
Li et al.

(10) Patent No.: US 11,897,345 B2
(45) Date of Patent: Feb. 13, 2024

(54) THREE-PHASE POWER SUPPLY AND COLLECTION DEVICE FOR MAGLEV TRAIN

(71) Applicant: SOUTHWEST JIAOTONG UNIVERSITY, Chengdu (CN)

(72) Inventors: Qunzhan Li, Chengdu (CN); Jiqin Wu, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 704 days.

(21) Appl. No.: 17/255,777

(22) PCT Filed: Jun. 21, 2019

(86) PCT No.: PCT/CN2019/092240
§ 371 (c)(1),
(2) Date: Dec. 23, 2020

(87) PCT Pub. No.: WO2020/001378
PCT Pub. Date: Jan. 2, 2020

(65) Prior Publication Data
US 2021/0129707 A1    May 6, 2021

(30) Foreign Application Priority Data
Jun. 25, 2018  (CN) .......................... 201810660427.2

(51) Int. Cl.
*B60L 5/39* (2006.01)
*B60L 5/36* (2006.01)
(Continued)

(52) U.S. Cl.
CPC ........ *B60L 5/39* (2013.01); *B60L 5/36* (2013.01); *B60L 13/10* (2013.01); *B60M 1/30* (2013.01); *B60M 1/34* (2013.01); *B60L 2200/26* (2013.01)

(58) Field of Classification Search
CPC .......... B60L 2200/26; B60L 5/39; B60L 5/40; B60L 5/36; B60L 13/10; B60L 5/38; B60L 5/42; B60M 1/34; B60M 1/30
See application file for complete search history.

(56) References Cited

U.S. PATENT DOCUMENTS

| 1,411,998 A | * | 4/1922 | Grace | ....................... B60L 5/38 |
| | | | | 191/63 |
| 3,804,996 A | * | 4/1974 | Monteith | .................. B60L 5/38 |
| | | | | 191/1 R |

(Continued)

FOREIGN PATENT DOCUMENTS

| CN | 203410320 U | 1/2014 |
| CN | 205686202 U | 11/2016 |

(Continued)

OTHER PUBLICATIONS

International Search Report from PCT/CN2019/092240 dated Sep. 27, 2019 (2 pages).

*Primary Examiner* — S. Joseph Morano
*Assistant Examiner* — Cheng Lin
(74) *Attorney, Agent, or Firm* — Calfee, Halter & Griswold LLP

(57) ABSTRACT

The present invention provides a three-phase power supply and collection device for a maglev train. A cross beam is arranged at the middle part of the bogie of the maglev train, and the lower surface of the cross beam is provided with three sets of longitudinal bearing seats, and three insulating bushes, three collector shoes and three power supply rails corresponding to the longitudinal bearing seats; the two ends of the horizontal part of each insulating bush is a rotating shaft structure, and the vertical part of the insulating bush is a hollow tubular structure; the upper part of each collector shoe is the shoe handle, the lower part is the shoe body, and the bottom of the shoe body is in a concave semicircular (Continued)

shape; the top surface of each power supply rail is in a convex semicircular shape.

6 Claims, 2 Drawing Sheets

(51) Int. Cl.
*B60L 13/10* (2006.01)
*B60M 1/30* (2006.01)
*B60M 1/34* (2006.01)

(56) References Cited

U.S. PATENT DOCUMENTS

| | | | | |
|---|---|---|---|---|
| 3,971,537 | A | * | 7/1976 | Winkle ............... H02K 41/025 |
| | | | | 248/188.4 |
| 4,049,092 | A | * | 9/1977 | Lillard .................. B60L 5/40 |
| | | | | 191/40 |
| 4,447,680 | A | * | 5/1984 | Segar ..................... B60L 5/36 |
| | | | | 104/246 |
| 8,504,230 | B2 | * | 8/2013 | Matsumoto ............. B60L 7/14 |
| | | | | 318/400.3 |
| 9,834,095 | B2 | * | 12/2017 | Jacob ..................... B60L 5/39 |

FOREIGN PATENT DOCUMENTS

| | | | | | |
|---|---|---|---|---|---|
| CN | 206086401 | U | * | 4/2017 | |
| CN | 107966628 | A | * | 4/2018 | ........... G01R 31/006 |
| CN | 108725211 | A | | 11/2018 | |
| CN | 208515397 | U | | 2/2019 | |
| DE | 102013106889 | A1 | * | 1/2015 | .............. B60M 1/02 |
| GB | 2526557 | A | * | 12/2015 | ................ B60L 5/39 |
| JP | 55075985 | U | | 11/1978 | |
| JP | 59169502 | U | | 10/1984 | |
| JP | 62144501 | A | | 6/1987 | |
| JP | 2009124777 | A | | 6/2009 | |
| KR | 20080040271 | A | * | 5/2008 | |
| KR | 20080040271 | A | | 5/2008 | |

* cited by examiner

THREE-PHASE POWER SUPPLY AND COLLECTION DEVICE FOR MAGLEV TRAIN

CROSS-REFERENCE TO RELATED APPLICATIONS

This application is the National Stage of International Application No. PCT/CN2019/092240, filed on Jun. 21, 2019, which claims priority to Chinese Patent Application No. 201810660427.2 filed on Jun. 25, 2018, which are incorporated herein by reference in their entireties.

FIELD

The present invention relates to the technical field of power supply for a maglev train.

BACKGROUND

Maglev trains can be categorized into long stator driven ones and short stator driven ones. A long stator driven maglev train is driven by a long stator linear synchronous motor, i.e., the three-phase AC windings of the motor stator are laid on the two sides of the ground line, the power supply is provided by the converter (frequency conversion live pressure) in the ground substation, and the ground operation center controls the operation of the maglev train via the synchronous control of the synchronous motor. The advantages include: the ground synchronous motor has high power, and the maglev train has no mechanical contact with the long stator line, thus it is suitable for high-speed operation. However, a disadvantage is that the construction cost is high because the motor stator (long stator) windings are laid along the line. A short stator driven maglev train has the three-phase windings of the stator of the linear asynchronous motor arranged on the train (on two sides). Compared with the long stator scheme in which the three-phase windings of the motor stator are laid on the two sides of the ground line, the three-phase windings of the stator on the train are much shorter, hence the maglev train is named as a short stator driven maglev train. The rotor of the asynchronous motor in the short stator scheme is composed of very thin aluminum plates laid on the line (corresponding to the stator position on the train), and its structure is very simple. Therefore, the construction cost of a short stator maglev line is much lower than that of a long stator maglev line; in addition, since the control of a short stator driven maglev train is performed on the train, the operation control is easier. Since the motor windings of a short stator driven maglev train are arranged on the train, the converter (frequency conversion and live voltage) that provides power supply must also be installed in the train, and the power has to be supplied from the ground. However, at present, the power supply and collection to the converter on the train is achieved by means of the contact between the ground power supply rail and the collector shoe on the train. Consequently, the fluctuation and vibration of the train seriously affects the contact performance, thus affects the power collection (current collection) performance. Moreover, the higher the train speed, the greater the effect is. Therefore, a short stator driven maglev train is not suitable for high-speed operation although the cost is lower.

Apparently, the technical problem to be solved is as follow: inventing a power supply and collection device, which can supply and collect power in three phases and resolve the adverse effects of train fluctuation and vibration on the current collection performance, so as to make full use of the advantages and avoid disadvantages and enable low-cost short stator driven maglev trains to be competent for high-speed lines and achieve higher cost performance.

SUMMARY

The object of the present invention is to provide a three-phase power supply and collection device for a maglev train, which can effectively solve the technical problem of power supply and collection for high-speed maglev trains.

The object of the present invention is attained with the following technical scheme: a three-phase power supply and collection device for a maglev train, comprising power supply rails, collector shoes and cables, wherein a cross beam is arranged at a middle part of a bogie of the maglev train, and a lower surface of the cross beam is provided with three sets of longitudinal bearing seats on the left, middle and right sides; three insulating bushes, i.e., a left insulating bush, a middle insulating bush and a right insulating bush, are provided, corresponding to the longitudinal bearing seats, wherein each insulating bush is a T-shaped structure, the two ends of the horizontal part of the insulating bush have a structure of rotating shaft and are fixed to the bearing seat via a bearing respectively, and the vertical part of the insulating bush is a hollow tubular structure; three collector shoes, i.e., a left collector shoe, a middle collector shoe and a right collector shoe, are provided, corresponding to the left insulating bush, the middle insulating bush and the right insulating bush, wherein each collector shoe is a conductor and generally is an inverted T-shaped structure, an upper vertical part of the collector shoe is a shoe handle of the collector shoe, a lower horizontal part of the collector shoe is a shoe body of the collector shoe, and a lower surface of the shoe body is a concave semicircular contact surface; three power supply rails, i.e., a left power supply rail, a middle power supply rail and a right power supply rail, are provided corresponding to the collector shoes, wherein a top surface of each power supply rail is convex semicircular contact surface, and a bottom of the power supply rail is fixed on an insulated track bed; the left power supply rail, the middle power supply rail and the right power supply rail are respectively connected with three-phase power supply, and their contact surfaces contact with the contact surfaces of the left collector shoe, the middle collector shoe and the right collector shoe respectively to collect power; the shoe handle inserted into the vertical part of the hollow insulating bush is a cylinder, and a top end of the shoe handle is connected with a cable, which passes through the vertical part of the insulating bush and is led out from a top end of the insulating bush and connected with a three-phase converter on the maglev train; the three-phase power supply provides power to the three-phase converter of the maglev train via the power supply and collection device composed of power supply rails, collector shoes and cables; the three-phase converter provides power supply for the maglev train.

The contact force between the collector shoe and the power supply rail that are associated with each other is equal to the gravity of the collector shoe; the weight of each of the left collector shoe, the middle collector shoe and the right collector shoe is usually 2-5 kg.

Clearance is reserved between a bottom end of the insulating bush and a top of the shoe body of the collector shoe, and the clearance is greater than a suspension air gap of the maglev train, and the length of the shoe handle of the collector shoe is greater than half of the length of the vertical part of the insulating bush.

The length of the cable is greater than the length from the top end of the shoe handle to a input side of the three-phase converter of the maglev train when the maglev train is suspended.

A protective cover is arranged on the insulated track bed, and a bottom surface of the horizontal part in the protective cover is higher than a top end of the shoe body of the collector shoe.

An axis of the rotating shaft is parallel to a running direction of the power supply rail.

Lubricating oil may be filled to the surface of the shoe handles of the collector shoes or the inner surfaces of the vertical parts of the insulating bushes to enhance the adaptability of the maglev train during fluctuation and vibration and reduce the wear of the maglev train during fluctuation and vibration.

The working principle of the present invention is as follows: three sets of power supply rails, three sets of collector shoes, and associated cables form a three-phase power supply system for the three-phase converter of the maglev train; in the mechanical structure, with the contact surface between the collector shoe and the power supply rail as the center of a circle, the impact of fluctuation and vibration of the maglev train in the left-right direction and up-down direction on the contact and power collection between the collector shoe and the power supply rail is eliminated, which is to say, the impact of left-right fluctuation and vibration of the maglev train on the contact and power collection between the collector shoe and the power supply rail is eliminated by hinging the rotating shaft parallel to the longitudinal direction of the maglev train at the top end of the insulating bush to the bearing seat, and the impact of up-down fluctuation and vibration of the maglev train on the contact and power collection between the collector shoe and the power supply rail is eliminated by fitting the shoe handle of the collector shoe with the straight part of the insulating bush, so that the contact area between the collector shoe and the power supply rail is kept constant, and the maglev train can maintain excellent power supply and collection performance during operation, thus is adaptive to high-speed operation.

Since the contact force between the collector shoe and the power supply rail is equal to the gravity of the collector shoe, it is unnecessary to add any other mechanism to generate contact force.

Compared with the prior art, the present invention attains the following beneficial effects:

1. The three-phase power supply for the high-speed maglev train is realized, the power is maintained constant, and no negative sequence is generated in the power grid.
2. Since the contact force between the collector shoe and the power supply rail is equal to the gravity of the collector shoe, it is unnecessary to add any other mechanism to generate contact force.
3. The impact of fluctuation and vibration of the maglev train in the left-right direction and up-down direction on the contact between the collector shoe and the power supply rail is eliminated, so that short stator driven maglev trains can be applied on high-speed maglev lines; compared with long stator driven maglev trains, the investment can be greatly saved, and the cost performance can be improved.
4. The present invention employs advanced techniques, has outstanding performance, and is easy to implement.

DETAILED DESCRIPTION

Hereunder the present invention will be further detailed in embodiments, with reference to the accompanying drawings.

Figure 1:
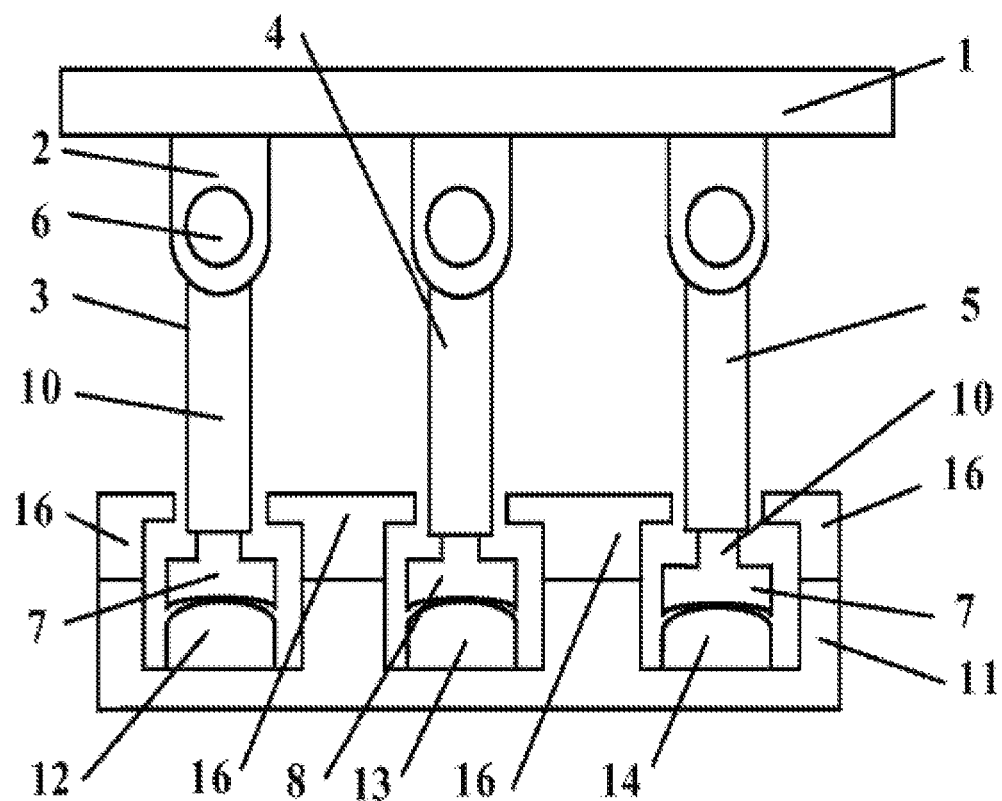
FIG. 1 is a front view of the structure of an embodiment of the present invention.

As shown in FIG. 1, a specific embodiment of the present invention is as follows: a cross beam 1 is arranged at the middle part of a bogie of the maglev train, and the lower surface of the cross beam 1 is provided with three sets of longitudinal bearing seats 2 on the left, middle and right sides; three insulating bushes, i.e., a left insulating bush 3, a middle insulating bush 4 and a right insulating bush 5, are provided, corresponding to the longitudinal bearing seats, wherein each insulating bush is a T-shaped structure, the two ends of the horizontal part of the insulating bush have a structure of rotating shaft 6 and are fixed to the bearing seat 2 via a bearing respectively, and the vertical part of the insulating bush is a hollow tubular structure; three collector shoes, i.e., a left collector shoe 7, a middle collector shoe 8 and a right collector shoe 9, are provided, corresponding to the left insulating bush, the middle insulating bush and the right insulating bush, wherein each collector shoe is a conductor and generally is an inverted T-shaped structure, an upper vertical part of the collector shoe is the shoe handle 10 of the collector shoe, a lower horizontal part of the collector shoe is the shoe body of the collector shoe, and the lower surface of the shoe body is a concave semicircular contact surface; three power supply rails, i.e., a left power supply rail 12, a middle power supply rail 13 and a right power supply rail 14, are provided corresponding to the collector shoes, wherein the top surface of each power supply rail is convex semicircular contact surface, and the bottom of the power supply rail is fixed on an insulated track bed 11; the left power supply rail 12, the middle power supply rail 13 and the right power supply rail 14 are respectively connected with three-phase power supply, and their contact surfaces contact with the contact surfaces of the left collector shoe 7, the middle collector shoe 8 and the right collector shoe 9 respectively to collect power; the shoe handle 10 inserted into the vertical part of the hollow insulating bush is a cylinder, and the top end of the shoe handle 10 is connected with a cable 15, which passes through the vertical part of the insulating bush and is led out from the top end of the insulating bush and connected with a three-phase converter on the maglev train; the three-phase power supply provides power to the three-phase converter of the maglev train via the power supply and collection device composed of power supply rails, collector shoes and cables; the three-phase converter provides power supply for the maglev train.

Clearance is reserved between the bottom end of the insulating bush and the top of the shoe body of the collector shoe, and the clearance is greater than the suspension air gap of the maglev train, and the length of the shoe handle 10 of the collector shoe is greater than half of the length of the vertical part of the insulating bush.

The length of the cable 15 is greater than the length from the top end of the shoe handle to the input side of the three-phase converter of the maglev train when the maglev train is suspended.

A protective cover 16 may be added on the insulated track bed 11, and the protective cover is an inverted T-shaped structure, and the bottom end of the horizontal part of the protective cover is higher than the top end of the shoe body of the collector shoe; the protective cover can protect against electric shock.

The contact force between the collector shoe and the power supply rail that are associated with each other is equal to the gravity of the collector shoe; the weight of each of the left collector shoe 7, the middle collector shoe 8 and the right collector shoe 9 is usually 2-5 kg.

The axis of the rotating shaft is parallel to the running direction of the power supply rail.

Figure 2:
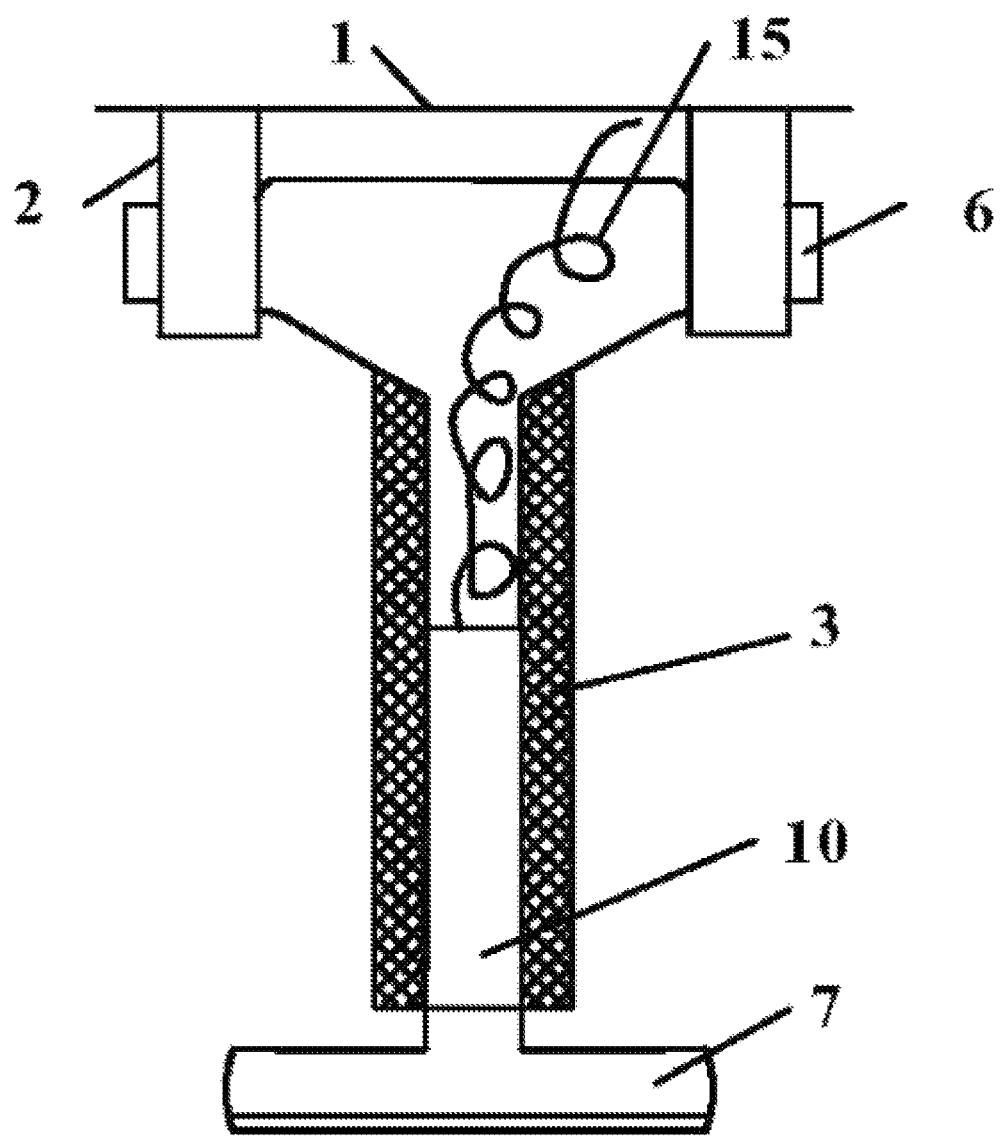
FIG. 2 is a left partial sectional view of the insulating bush in an embodiment of the present invention.

FIG. 2 is a side view of the collector shoe in an embodiment of the present invention. The middle part of the bogie of the maglev train is provided with a cross beam 1, and the lower surface of the cross beam 1 is provided with bearing seats 2; insulating bushes 3 are provided, corresponding to the bearing seats 2, and each insulating bush 3 has a T-shaped structure, the two ends of the horizontal part of the insulating bush have a structure of rotating shaft 6 and are fixed to the bearing seat 2 via bearings respectively, and the vertical part of the insulating bush is a hollow tubular structure; collector shoes 7 are provided, corresponding to the insulating bushes, and each collector shoe is a conductor and is generally an inverted T-shaped structure, the upper vertical part of the collector shoe is the shoe handle 10 of the collector shoe, and the lower horizontal part of the collector shoe is the shoe body of the collector shoe. The shoe handle 10 is inserted into the vertical part of the hollow insulating bush; the top end of the shoe handle 10 is connected with a cable 15; the cable 15 passes through the vertical part of the insulating bush and is led out from the top end of the insulating bush, and then is connected to the three-phase converter on the maglev train.

The invention claimed is:

1. A three-phase power supply and collection device for a maglev train, comprising power supply rails, collector shoes and cables, wherein a cross beam is arranged at a middle part of a bogie of the maglev train, and a lower surface of the cross beam is provided with three sets of longitudinal bearing seats on the left, middle and right sides; a left insulating bush, a middle insulating bush and a right insulating bush are provided, corresponding to the longitudinal bearing seats, wherein each insulating bush is a T-shaped structure, the two ends of the horizontal part of the insulating bush have a structure of rotating shaft and are fixed to the bearing seat via a bearing respectively, and the vertical part of the insulating bush is a hollow tubular structure; a left collector shoe, a middle collector shoe and a right collector shoe are provided, corresponding to the left insulating bush, the middle insulating bush and the right insulating bush, wherein each collector shoe is a conductor and generally is an inverted T-shaped structure, an upper vertical part of the collector shoe is a shoe handle of the collector shoe, a lower horizontal part of the collector shoe is a shoe body of the collector shoe, and a lower surface of the shoe body is a concave semicircular contact surface; three power supply rails are provided corresponding to the collector shoes, including a left power supply rail, a middle power supply rail and a right power supply rail, wherein a top surface of each power supply rail is convex semicircular contact surface, and a bottom of the power supply rail is fixed on an insulated track bed; the left power supply rail, the middle power supply rail and the right power supply rail are respectively connected with three-phase power supply, and their contact surfaces contact with the contact surfaces of the left collector shoe, the middle collector shoe and the right collector shoe respectively to collect power; the shoe handle in clearance fit with the vertical part of the hollow insulating bush is a cylinder, and a top end of the shoe handle is connected with a cable, which passes through the vertical part of the insulating bush and is led out from a top end of the insulating bush and connected with a three-phase converter on the maglev train; the three-phase power supply provides power to the three-phase converter of the maglev train via the power supply and collection device composed of power supply rails, collector shoes and cables.

2. The three-phase power supply and collection device for a maglev train according to claim 1, wherein the contact force between the collector shoe and the power supply rail that are associated with each other is equal to the gravity of the collector shoe; the weight of each of the left collector shoe, the middle collector shoe and the right collector shoe is 2-5 kg.

3. The three-phase power supply and collection device for a maglev train according to claim 1, wherein clearance is reserved between a bottom end of the insulating bush and a top of the shoe body of the collector shoe, and the clearance is greater than a suspension air gap of the maglev train, and the length of the shoe handle of the collector shoe is greater than half of the length of the vertical part of the insulating bush.

4. The three-phase power supply and collection device for a maglev train according to claim 1, wherein the length of the cable is greater than the length from the top end of the shoe handle to a input side of the three-phase converter of the maglev train when the maglev train is suspended.

5. The three-phase power supply and collection device for a maglev train according to claim 1, wherein a protective cover is arranged on the insulated track bed, and a bottom surface of a horizontal part in the protective cover is higher than a top end of the shoe body of the collector shoe.

6. The three-phase power supply and collection device for a maglev train according to claim 1, wherein an axis of the rotating shaft is parallel to a running direction of the power supply rail.

* * * * *